US008925777B1

(12) United States Patent
Casucci et al.

(10) Patent No.: US 8,925,777 B1
(45) Date of Patent: Jan. 6, 2015

(54) TRUCK BED STORAGE DEVICE

(71) Applicants: Paul Thaddeus Casucci, Salinas, CA (US); Eva Terez Casucci, Salinas, CA (US)

(72) Inventors: Paul Thaddeus Casucci, Salinas, CA (US); Eva Terez Casucci, Salinas, CA (US); Andrew Joseph Holtz, Atascadero, CA (US); Kyle Emery Peterson, San Luis Obispo, CA (US)

(73) Assignees: Paul Thaddeus Casucci, Salinas, CA (US); Eva Terez Casucci, Salinas, CA (US)

( * ) Notice: Subject to any disclaimer, the term of this patent is extended or adjusted under 35 U.S.C. 154(b) by 0 days.

(21) Appl. No.: 13/887,067

(22) Filed: May 3, 2013

Related U.S. Application Data

(60) Provisional application No. 61/641,973, filed on May 3, 2012.

(51) Int. Cl.
*B60R 9/00* (2006.01)
*A47B 53/00* (2006.01)
*B60R 9/06* (2006.01)

(52) U.S. Cl.
CPC . *B60R 9/00* (2013.01); *A47B 53/00* (2013.01); *B60R 9/065* (2013.01)
USPC .......................... 224/404; 296/37.6; 312/201

(58) Field of Classification Search
USPC ............... 224/402, 403, 404; 296/37.1, 37.6; 312/201, 202, 298, 302
See application file for complete search history.

(56) References Cited

U.S. PATENT DOCUMENTS

| | | | | | |
|---|---|---|---|---|---|
| 2,784,027 | A | * | 3/1957 | Temp | 296/156 |
| 3,727,971 | A | * | 4/1973 | Sisler | 296/37.6 |
| 4,375,306 | A | * | 3/1983 | Linder | 312/249.9 |
| 4,469,364 | A | * | 9/1984 | Rafi-Zadeh | 296/37.6 |
| 4,705,315 | A | * | 11/1987 | Cherry | 296/37.1 |
| 5,145,245 | A | * | 9/1992 | Fierthaler | 312/321.5 |
| 5,964,492 | A | * | 10/1999 | Lyon | 296/37.6 |
| D440,429 | S | * | 4/2001 | Wales et al. | D6/446 |
| 7,052,066 | B2 | * | 5/2006 | Emery et al. | 296/37.1 |
| 7,159,917 | B2 | * | 1/2007 | Haaberg | 296/26.09 |
| 7,309,093 | B2 | * | 12/2007 | Ward | 296/37.6 |
| 8,240,527 | B1 | * | 8/2012 | Casselton | 224/404 |
| 8,636,182 | B1 | * | 1/2014 | Gordon | 224/404 |

* cited by examiner

*Primary Examiner* — Justin Larson
(74) *Attorney, Agent, or Firm* — Heisler & Associates

(57) ABSTRACT

The storage system includes multiple cabinets within an enclosure mounted in a bed of a truck, such as a pickup truck bed. The cabinets each include rear walls which are hinged together at rear corners thereof to allow the cabinets to pivot relative to each other. An innermost one of a series of cabinets is slidably mounted within the enclosure so that it can slide into and out of the enclosure along with the other cabinets hinged thereto. Each cabinet has doors which can be selectively opened to allow for access into an interior of the cabinets. The cabinets have a storage position where they are contained within the enclosure and a deployed position where they are slid out of the enclosure and pivoted to provide easy access to contents of the cabinets outside of the truck bed.

20 Claims, 8 Drawing Sheets

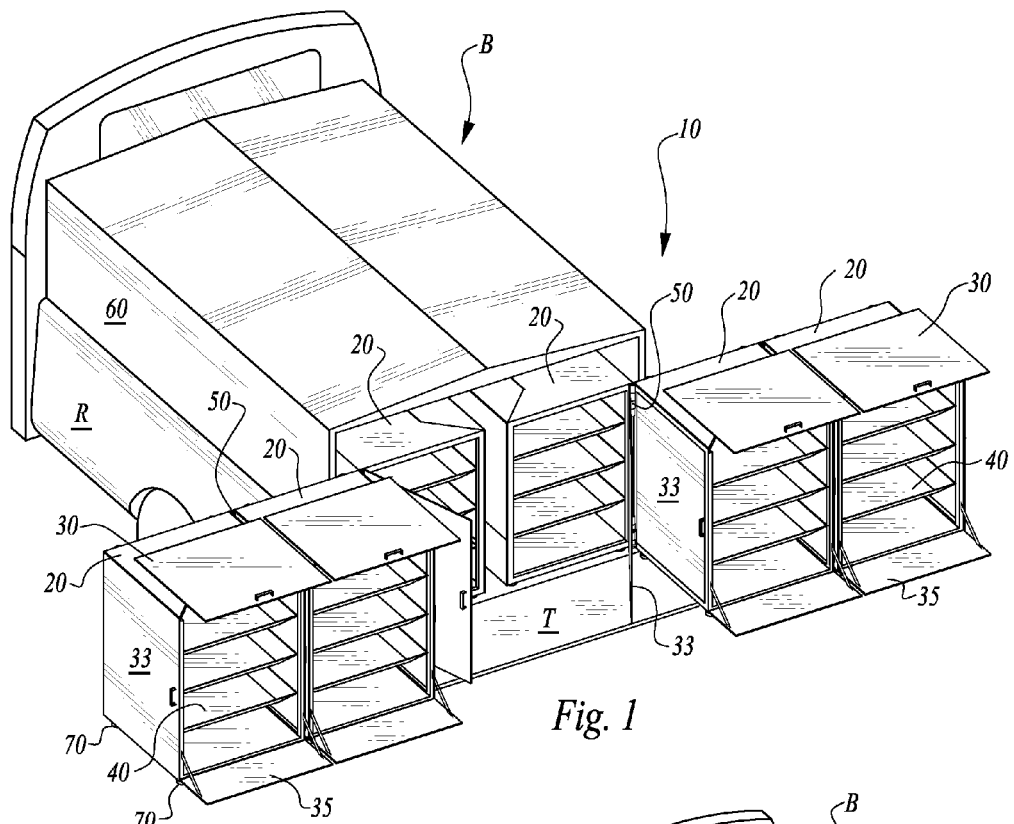
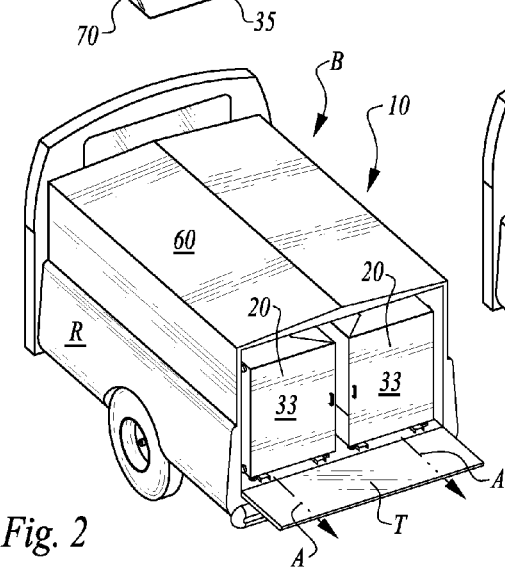
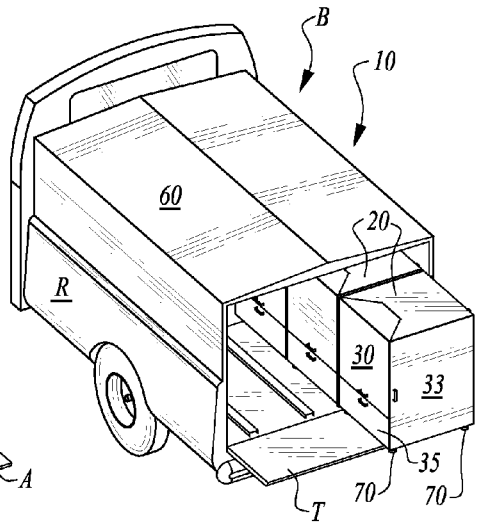

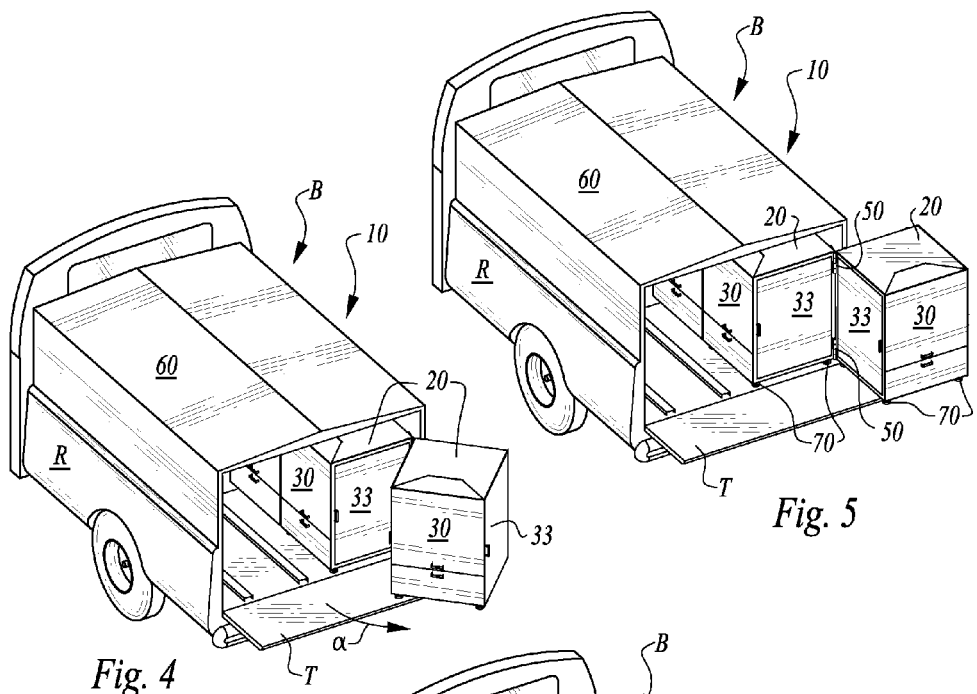
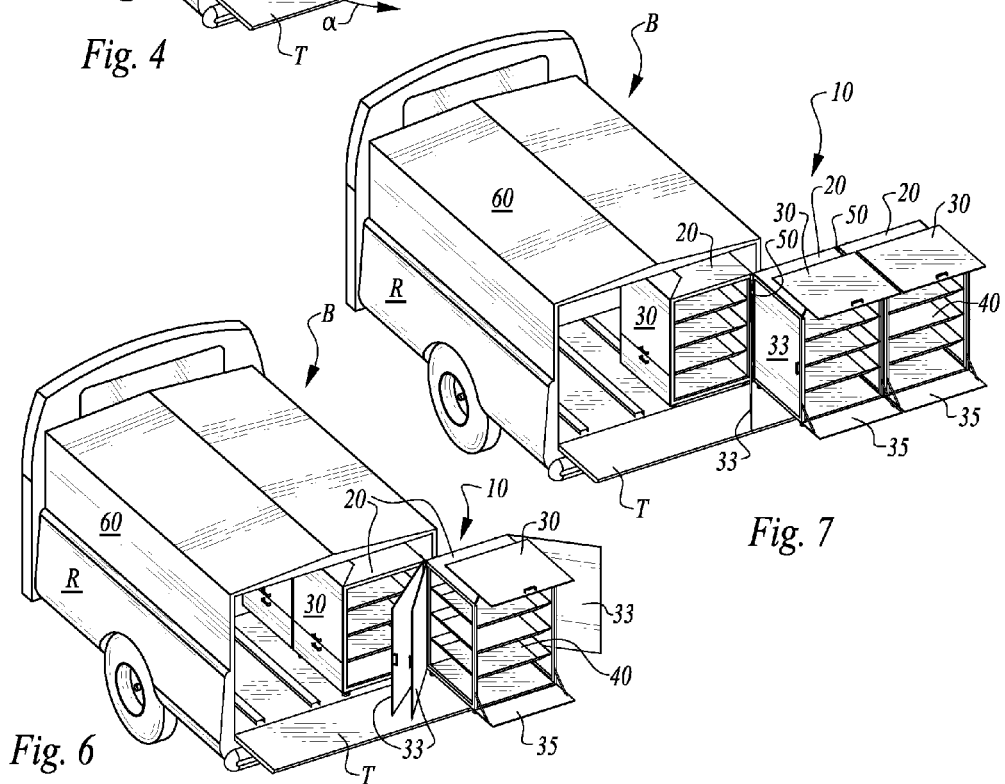

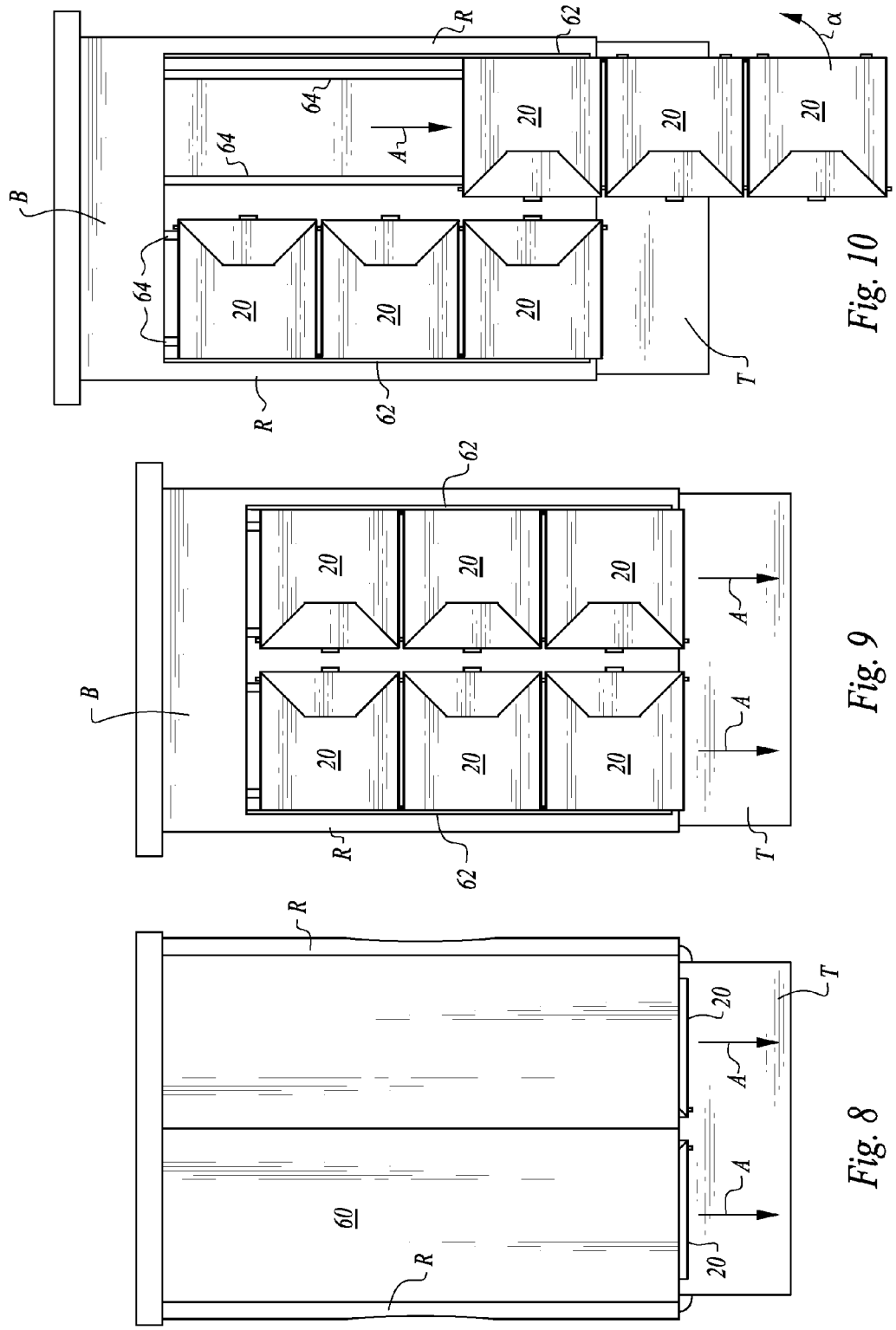

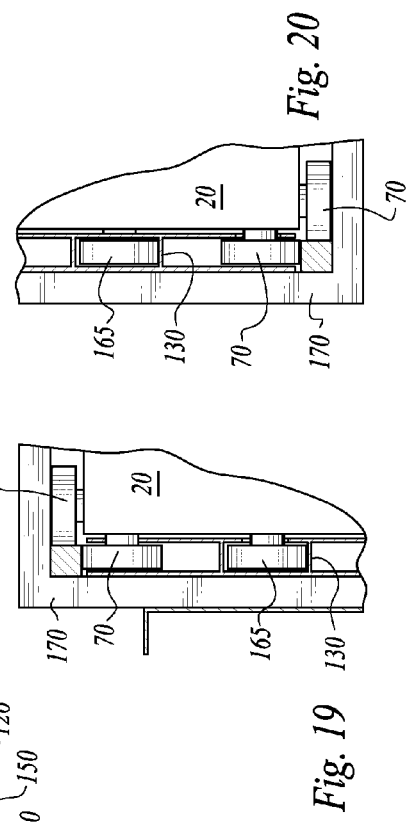
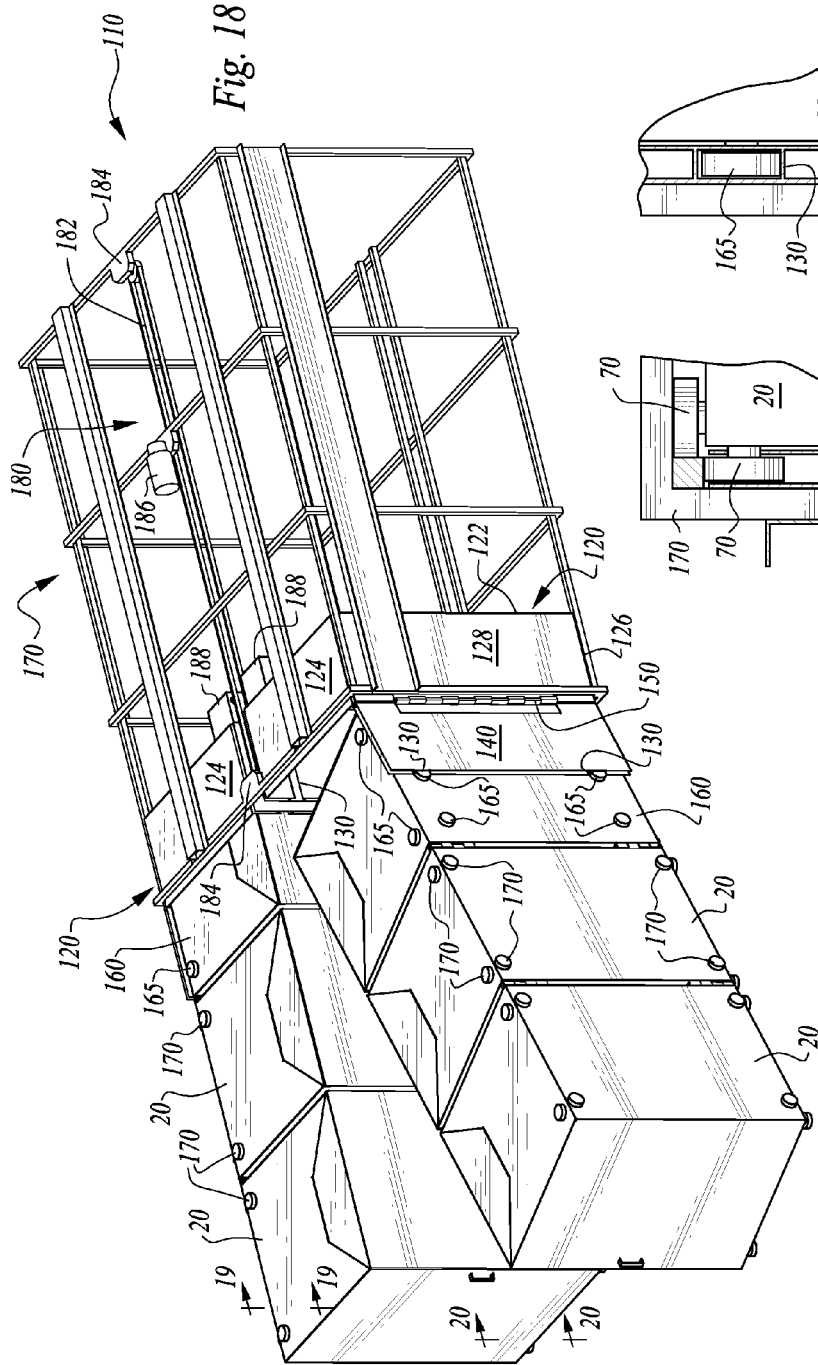

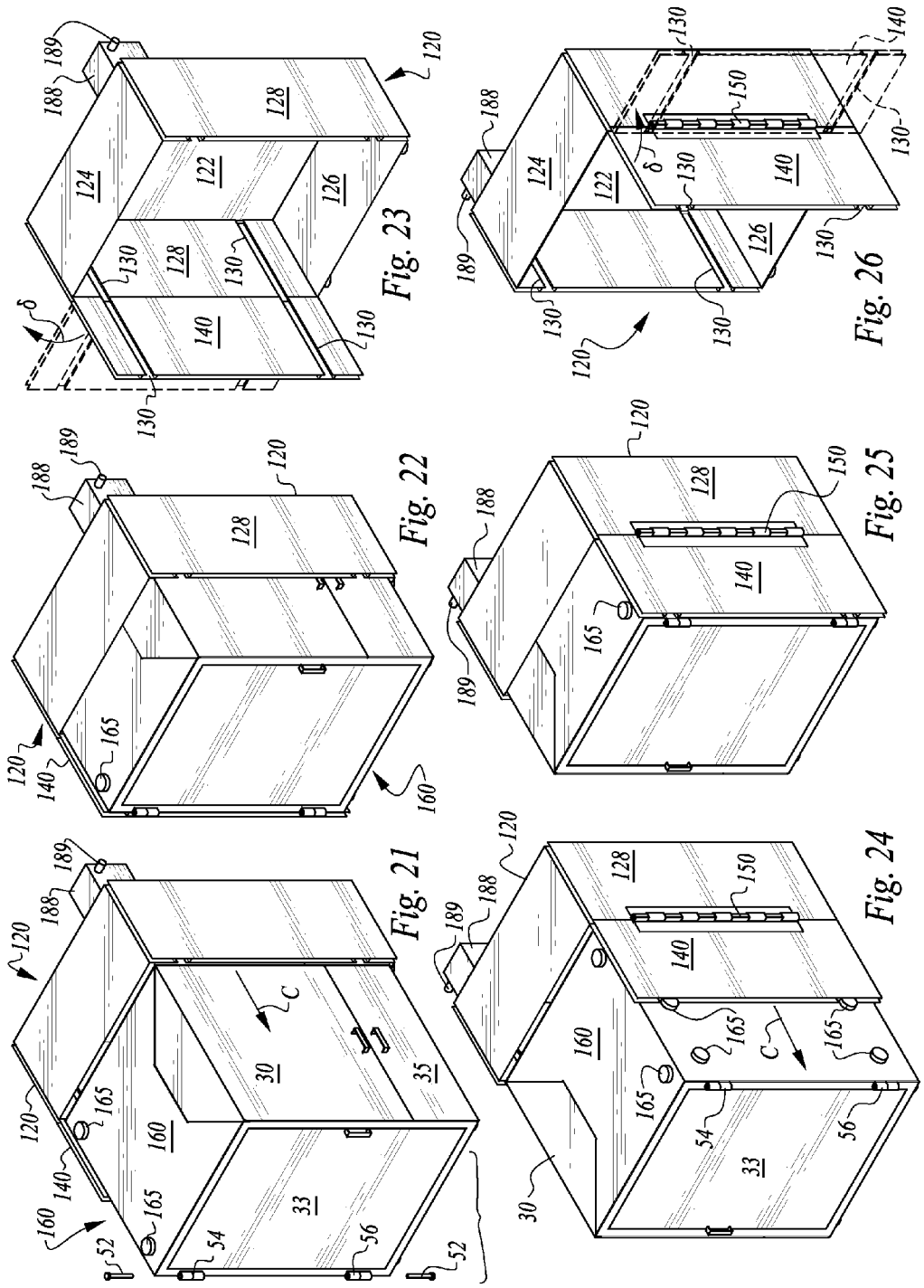

TRUCK BED STORAGE DEVICE

CROSS-REFERENCE TO RELATED APPLICATIONS

This application claims benefit under Title 35, United States Code §119(e) of U.S. Provisional Application No. 61/641,973 filed on May 3, 2012.

FIELD OF THE INVENTION

The following invention relates to truck storage systems and particularly truck bed mounted storage systems. More particularly, this invention relates to truck bed storage systems which include multiple separate cabinets which both slide out of an enclosure within the bed and pivot relative to each other once deployed out of the bed.

BACKGROUND OF THE INVENTION

The contents of the interiors of truck beds are often cluttered, disorganized, and not readily accessible. Most truck beds are loaded by lifting objects over the side rails of the bed or by placing the load onto the lowered tail gate and then by sliding it further into the vehicle. Such loading and unloading also requires extensive walking around the back and sides of the vehicle to enable loading the entire truck bed. Some climbing into and out of the truck bed can also be necessary. In both cases the ability to organize the contents of the bed is poor and inefficient.

To facilitate truck bed storage, the prior art provides the ability to place loads into the truck bed within containers and drawers, storing and keeping the contents organized. This helps the user access the load from the truck bed through the use of drawers and cabinet doors which protect the contents from the outside environment.

At best, such prior art containers and drawers organize the truck bed somewhat, but the user is left to continue loading the truck bed in a manner which is very similar to the method by which the user loads a truck bed without the storage device. Besides lifting items over the side rails of the bed in order to place them into a compartment, the interior contents often cannot be readily accessed and the deeper interior of the bed remains unused due to inaccessibility. Furthermore, often loading the bed requires multiple walking trips around the vehicle to load all side compartments properly.

Other, chassis mounted storage systems can provide more access but they require the user to remove the entire truck bed in order to lower the level of the compartments. Besides, this system is considered unattractive and does not eliminate the need to walk around the vehicle to facilitate loading. Further there is no simple opportunity to remove the chassis mounted storage systems if a user desires to use the truck to haul a load on occasion.

Accordingly, a need exists for a storage system which can be movable from a first position contained within a truck bed and a second deployed position where storage cabinets are moved out of the truck bed in position for ready access at a single working location. Such a system should be easy to operate both to deploy and to simply return the cabinets.

SUMMARY OF THE INVENTION

With this invention truck bed storage is provided within a series of multiple separate cabinets. The cabinets have a stored position and a deployed position. In the stored position they are all stored within the bed of the pickup truck. In the deployed position at least some of the cabinets are fully deployed out of the bed. This deployment involves first sliding and second pivoting.

Pivoting is provided by hinging the cabinets together. Each cabinet has a rear wall with rear corners at either side thereof. These rear corners which are adjacent other cabinets have a hinge joining the adjacent cabinets together. Thus, pivoting about a substantially vertical axis is facilitated between adjacent cabinets.

The cabinets are also configured to slide out of the bed of the truck. In one embodiment this sliding is facilitated by providing the cabinets within an enclosure which is mounted within the truck bed. In other embodiments the bed itself defines the enclosure. The multiple cabinets include two or more cabinets mounted to at least one side wall of the enclosure, and preferably multiple cabinets in two sets mounted to each opposite side wall of the enclosure so that left and right sets of cabinets are provided.

Each set of cabinets includes an innermost cabinet, an outermost cabinet, and potentially intermediate cabinets between the innermost cabinet and the outermost cabinet. Each of the cabinets are hingedly attached to adjacent cabinets to facilitate pivoting about a substantially vertical axis. At least the innermost cabinet is also rotatably supported through wheels on rails within the enclosure, such as along the side wall, in a preferred embodiment. The wheels could be replaced with other translational support structures, such as slides in alternative embodiments. Most preferably, each of the cabinets is supported by a rail or other sliding support when the cabinets are within the enclosure.

In one embodiment the innermost cabinet remains at least partially within the enclosure and does not pivot relative to the enclosure. In a second embodiment the innermost cabinet is configured as a nesting cabinet which nests within a cabinet support shell. The cabinet support shell is slidably supported within the enclosure. The nesting cabinet can extend out of the cabinet support shell and pivot relative to the cabinet support shell such that in this embodiment both the nesting cabinet and all other cabinets pivotably attached to the nesting cabinet can extend fully out of the enclosure in the truck bed.

The cabinets together can entirely contain the enclosure space within the truck bed, or can only fill up a portion of this space, with sizes and shapes of the cabinets being adjustable to match enclosure sizes which in turn are sized to match different truck bed sizes, along with accommodation for any desired open space outside of the cabinets. The enclosure preferably has a lid configured to shed water and to provide a secure environment for the cabinets. This enclosure also preferably provides a rigid super structure to prevent distortion of the enclosure when loads associated with the various different positions of the cabinets and movement of the cabinets is exerted upon this enclosure. Also, an automatic deployment system can be configured as part of the enclosure and interact with the innermost cabinet or the cabinet support shell to allow for powered automatic deployment and storage of the cabinets under the direction of an operator.

The individual cabinets are preferably generally orthorhombic in shape with three sets of parallel spaced sides. A rear wall is provided with vertical edges having hinges for connection to adjacent cabinets. A front side opposite the rear wall is covered by a door which is preferably in the form of a compound door which actually pivots from a portion of a roof of the cabinet. The roof is provided spaced from a floor and defines a height of the cabinet. Side walls extend from the rear wall to a front of the cabinet between the floor and the roof. These side walls are preferably covered by side doors which can pivotably open to provide further access to an interior of the cabinet through the sides. Thus, the cabinets can have their interiors accessed either through a front or through sides thereof. In one embodiment the side doors are pivotably attached to the same hinge structure which hingedly attaches adjacent cabinets together.

Each cabinet preferably includes multiple trays therein. These trays can rest upon separate shelves or can themselves define shelves within an interior of the cabinet. In one embodiment, rails are provided extending from the rear wall of the cabinet to posts at vertically extending corners of the front side of the cabinet opposite the rear wall. Rails can also extend between these posts. The rails extend horizontally at multiple elevations and can catch a rim of each tray to hold each tray in place. The rails can also accommodate sliding of the trays into and out of the cabinet somewhat, such as through the compound door or an alternate flat door, or through one of the side doors.

OBJECTS OF THE INVENTION

Accordingly, a primary object of the present invention is to provide a storage system which can fit within a bed of a truck and be deployed out of the truck bed to allow easy access to equipment stored within the storage system.

Another object of the present invention is to provide a truck bed storage system which can have multiple different compartments deployable from the truck bed to surround a common single area and allow for access to equipment without having to walk around multiple different sides of the truck bed.

Another object of the present invention is to provide a truck mounted storage system which is movable between a stored configuration and a deployed configuration with the deployed configuration positioning cabinets adjacent a single work area.

Another object of the present invention is to provide a storage cabinet support system for moving cabinets into and out of a truck bed for access to multiple cabinets simultaneously.

Another object of the present invention is to provide a support method for cabinets which can mount within a truck bed which allows for sliding deployment of cabinets from the truck bed as well as pivoting motion of the cabinets relative to each other.

Another object of the present invention is to provide a cabinet storage system for a truck bed which keeps multiple cabinets thereof fully contained and enclosed when not in use.

Another object of the present invention is to provide a multiple cabinet storage system which is sized to fit within a truck bed and which can be removed from the truck bed when desired or installed within the truck bed in a temporary fashion, while allowing the cabinets therein to be deployed or stored within an enclosure of the storage system to suit the needs of the user.

Other further objects of the present invention will become apparent from a careful reading of the included drawing figures, the claims and detailed description of the invention.

BRIEF DESCRIPTION OF THE DRAWINGS

FIG. 1 is a perspective view of a truck bed with a storage system according to a first embodiment of this invention mounted therein and with cabinets of the storage system fully deployed and with some doors of the cabinet open to reveal interiors of the cabinets.

FIGS. 2-7 are perspective views of that which is shown in FIG. 1 revealing various stages in the deployment of the cabinets out of a cabinet enclosure, and with some of the cabinets removed in some views to more clearly show other cabinets of the storage system.

FIGS. 8-10 are top plan views of that which is shown in FIG. 1, with portions of an enclosure thereof cut away in FIGS. 9 and 10, and with the cabinets shown in various positions to reveal operation of the storage system for deployment of cabinets thereof.

FIG. 18 is a perspective view of an alternative embodiment storage system shown off of a truck bed in which it can be mounted, and revealing a super structure enclosure and two sets of cabinets mounted through an innermost nesting cabinet and cabinet support shell to facilitate full deployment out of the enclosure for each cabinet within each set of cabinets.

FIGS. 19 and 20 are detailed sectional views of portions of that which is shown in FIG. 18 revealing details of how wheels and rollers of the various cabinets can be supported by tracks and grooves of the enclosure and the cabinet support shell to support the multiple cabinets in this embodiment of the invention.

FIGS. 21-26 are perspective views of the cabinet support shell of the storage system embodiment of FIG. 18 along with the nesting cabinet in some views, and illustrating relative motion of the nesting cabinet relative to the cabinet support shell and structural details of the nesting cabinet and the cabinet support shell, according to this embodiment of FIG. 18.

DESCRIPTION OF THE PREFERRED EMBODIMENT

Figure 11:
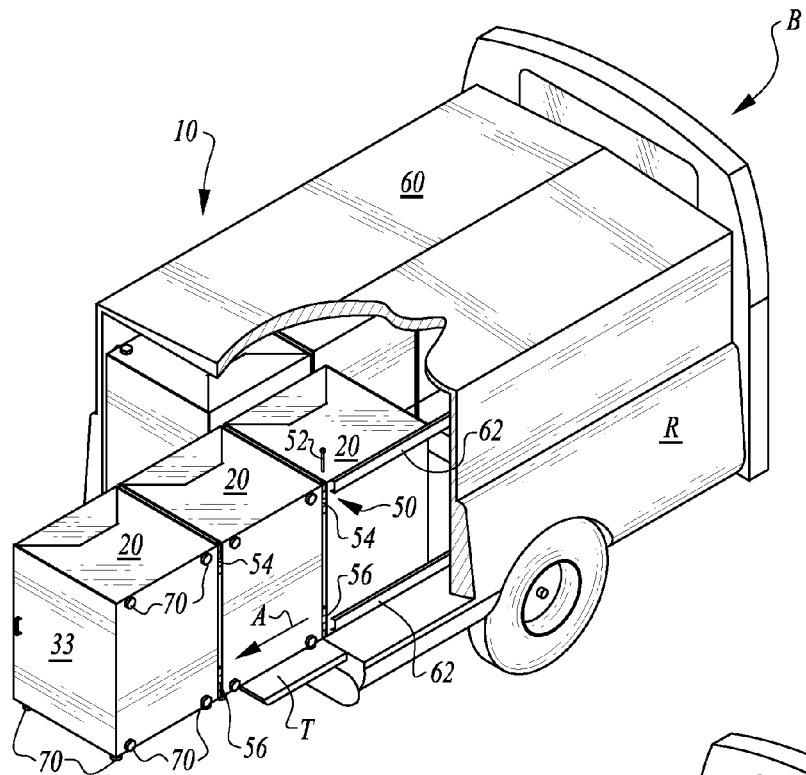
FIG. 11 is a perspective view of that which is shown in FIG. 1 with portions of the enclosure cut away and with one set of cabinets shown partially deployed out of the enclosure in a sliding direction.
Figure 15:
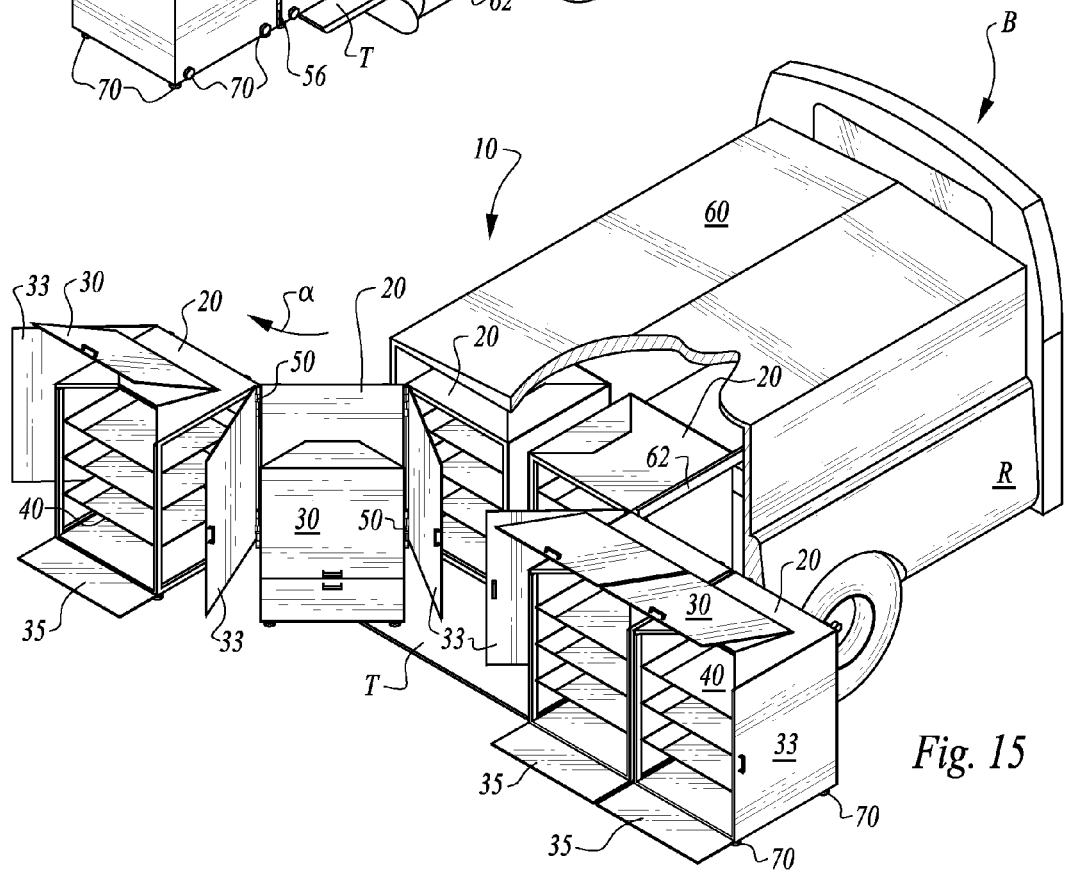
FIG. 15 is a perspective view of that which is shown in FIG. 1 with portions of the enclosure cut away and with both sets of cabinets shown deployed from the enclosure and pivoting relative to each other for access to the cabinets adjacent a work area according to a method of this invention.

Referring to the drawings, wherein like reference numerals represent like parts throughout the various drawing figures, reference numeral 10 is directed to a storage system (FIGS. 1-17) which is mountable within a bed B of a truck. The system 10 includes multiple cabinets 20 mounted within an enclosure 60 and deployable out of the enclosure 60 or storable within the enclosure 60. The storage system 10 facilitates both sliding motion of the cabinets 20 into and out of the enclosure 60 (arrow A of FIG. 2) and pivoting motion of adjacent cabinets 20 (arrow α of FIG. 4) relative to each other. The cabinets 20 can thus be deployed out of the enclosure 60 to place the cabinets 20 conveniently adjacent a work station where all of the cabinets 20 can be accessed without having to walk around the vehicle or awkwardly reach into the bed B.

In essence, and with particular reference to FIG. 1, basic details of the storage system 10 are described, according to a first exemplary embodiment. The system 10 includes multiple cabinets 20 which are of similar size and shape. The cabinets 20 include an innermost cabinet, an outermost cabinet, and optionally intermediate cabinets between the innermost cabinet and outermost cabinet 20. Cabinets 20 are preferably provided in sets including a left set of cabinets 20 and a right set of cabinets 20. Each set of cabinets 20 is pivotably attached together through hinges 50. The hinges allow for pivoting of the cabinets 20 (along arrow α of FIG. 4). The sets of cabinets 20 can also be slid into and out of the enclosure 60 (along arrow A of FIG. 2).

Doors such as a compound door 30 are openable to provide access into an interior of each cabinet 20. Trays 40 define one form of shelving to support contents within an interior of each cabinet 20. At least the innermost cabinet 20 includes wheels 70 which roll along side tracks 62 and/or floor tracks 64 (FIGS. 10 and 11) of the enclosure 60, to allow for support of the sets of cabinets 20 as they slide and to keep the cabinets connected to the enclosure 60 and the vehicle bed B.

In an alternative embodiment (FIGS. 18-26) a cabinet support shell 120 is provided in an alternative storage system 110. This cabinet support shell 120 is slidably supported relative to a super structure 170 defining a form of enclosure. An innermost cabinet of the set of cabinets is configured as a nesting cabinet 160 which can nest into the cabinet support shell 120 at least somewhat. With the cabinet support shell 120 in this alternative storage system 110, each of the cabinets 20, including the innermost nesting cabinet 160, can be fully deployed out of the enclosure while still keeping the cabinets 20, 160 connected to the enclosure and to the vehicle in which the enclosure is mounted. This alternative storage system 110 also shows a deployment system 180 which is powered and controlled by a user through appropriate inputs to a controller to cause automatic deployment and re-storage of the cabinets 20 into and out of the super structure 170 or other enclosure.

Figure 12:
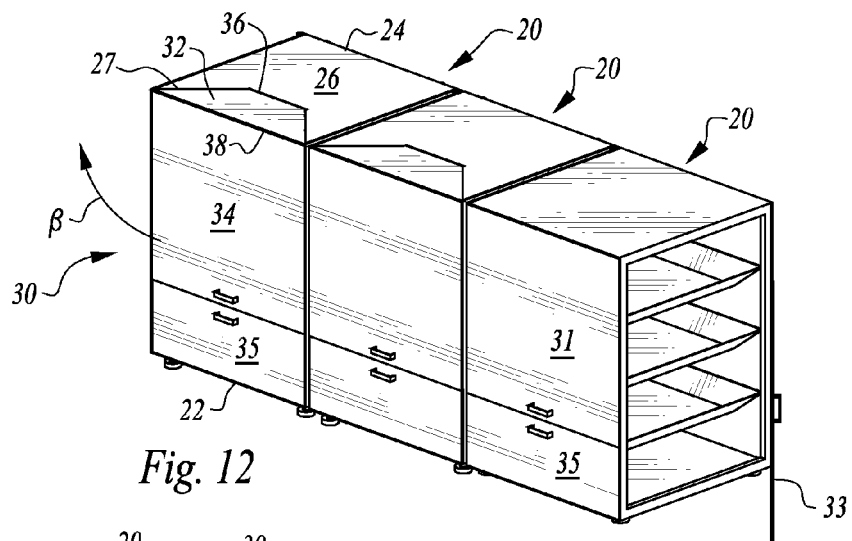
FIGS. 12-14 are perspective views of a set of cabinets shown separate from other portions of the system and revealing details of the cabinets and how they attach together about hinges therebetween.
Figure 13:
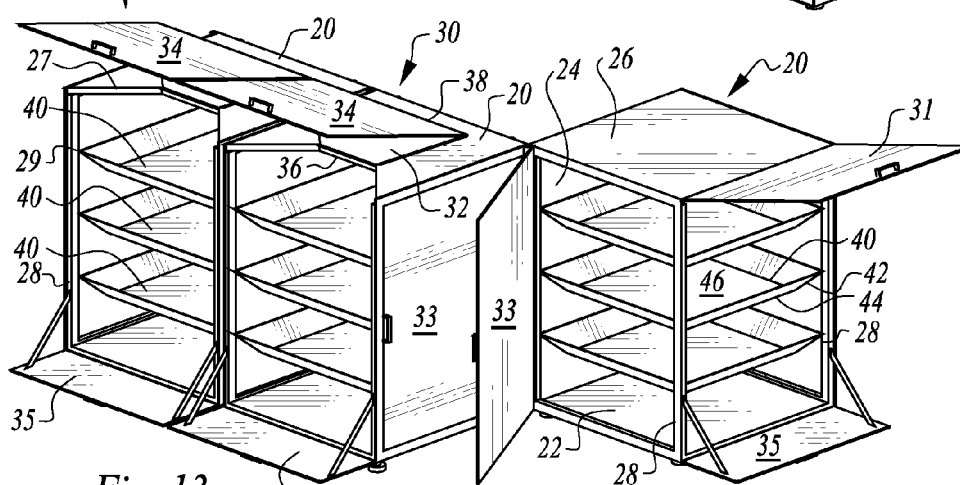
Figure 14:
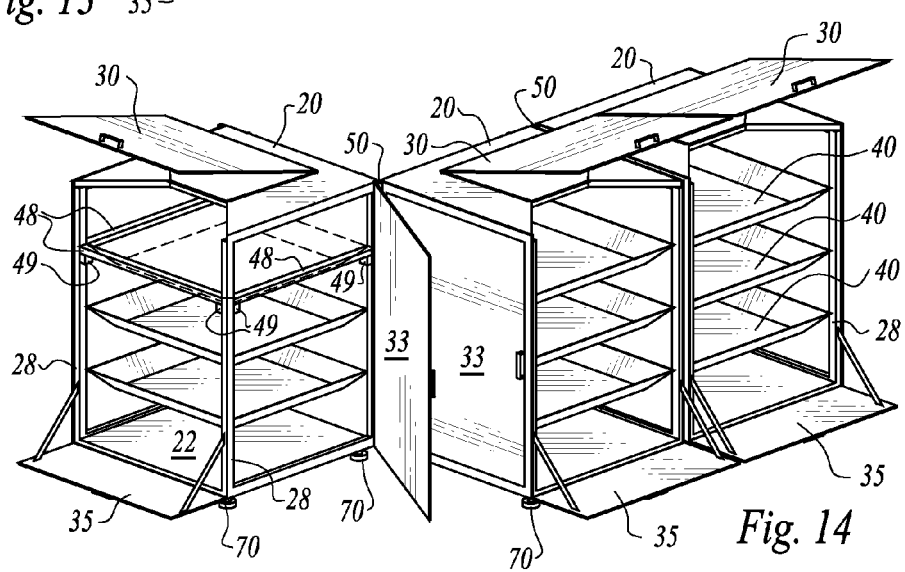
Figure 16:
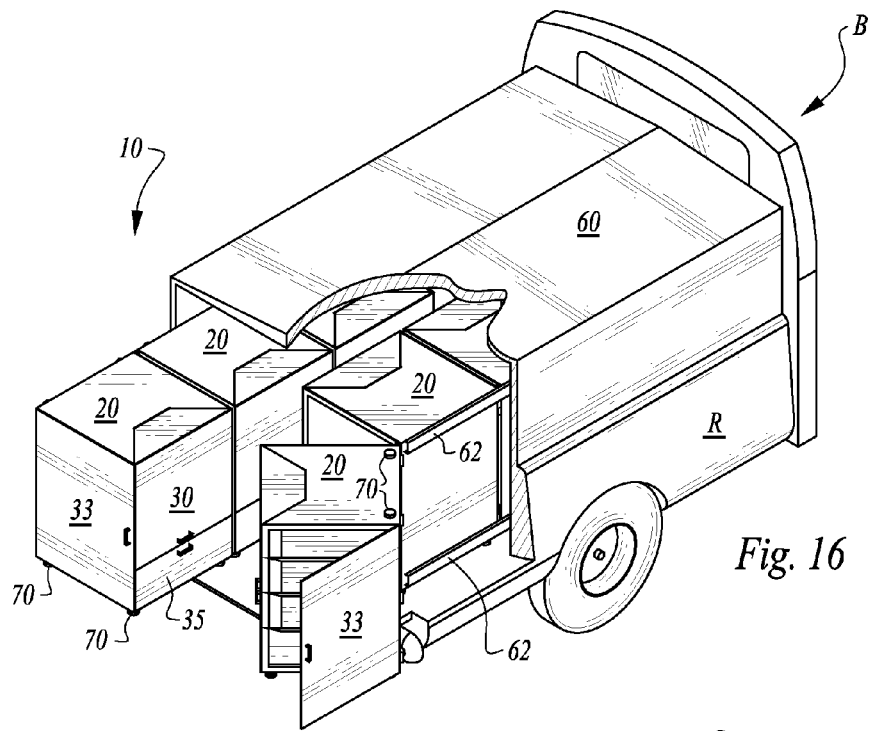
FIGS. 16 and 17 are perspective views of that which is shown in FIG. 1 with a portion of the enclosure cut away and further revealing various different configurations for the cabinets adjacent a work area.

More specifically, and with particular reference to FIGS. 12-14, particular details of the cabinet 20 according to a first exemplary embodiment of this invention, are described. The cabinet 20 acts as a support for containing a variety of different objects and to carry those objects out of the enclosure 60 and to a position where these objects can be readily accessed by a user. Other forms of supports could alternatively be supplied such as drawer cabinets or special purpose cabinets configured to securely support a particular machine or other item either fixed to the special purpose cabinet or removable therefrom. Each cabinet 20 preferably has a similar size and shape which is most preferably orthorhombic with three mutually parallel sides which are perpendicular to the other sets of sides. In one embodiment the cabinets 20 are approximately two feet wide, two feet deep and three feet tall. In another embodiment, the cabinets 20 are about two feet in each dimension. As an alternative, the cabinets 20 could have different sizes. For instance one cabinet could be four feet wide and take up the space of two cabinets 20 that are two feet wide. Such a larger cabinet could be in one or both of the sets of cabinets 20.

Each cabinet 20 preferably includes a planar floor 22 which is oriented substantially horizontally and a rear wall 25 which extends up from a rear side of the floor 22 as a planar surface which is oriented substantially vertically. The rear wall 24 has side edges which act as locations for hinges 50 to allow for pivotable attachment of the cabinet 20 to any adjacent cabinets 20.

A planar roof 26 is oriented substantially parallel with the floor 22 and coupled to the rear wall 24 extending forward and generally horizontal from the rear wall 24. The floor 22, rear wall 24 and roof 26 are preferably permanently fixed structures, with the remaining three sides of the cabinet 20 preferably being selectively openable and closable.

Posts 28 extend up from a forward side of the floor 22 to a forward side of the roof 26. These posts 28 extend substantially vertically at forward corners of the cabinet 20. The roof 26 preferably includes a trapezoidal notch 27 forming a hole in the roof 26 with a longest side of this notch 27 on a forward side of the cabinet 20 and with the two diagonal sides of the notch 27 extending from the forward side to a portion of the notch 27 closest to a center point of the roof 26.

The posts 28 can be fitted with shelf support structures such as brackets to support trays 40 defining one form of shelf within the cabinet 20. Such bracket points 29 could have brackets permanently fixed to the posts 28 at positions for tray 40 support or could be fitted with adjustable supports at these bracket points 29, such as by forming the posts 28 with a plurality of holes therein and with pegs or other supports which can pass into these holes at various different locations to allow for adjustable height support for the trays 40 or other shelves within the cabinet 20.

Doors are provided to close these selectively openable portions of the cabinet 20. A forward side of the cabinet 20 is preferably selectively closable by a compound door 30. This compound door 30 has a top panel 32 separate from a front panel 34. The top panel 32 and front panel 34 are joined together along an upper front edge of the cabinet 20. The top panel 32 is sized to cover the notch 27 in the roof 26. The front panel 24 is sized to cover most of an upper portion of a front of the cabinet 20.

The top panel 32 and front panel 34 preferably hinge together at a mid hinge 38 therebetween and the top panel 32 is preferably pivotably attached through a mount hinge 36 to the roof 26. The hinges 36, 38 are oriented in an alternating configuration so that the compound door 30 can be lifted up (along arrow β of FIG. 12) and the top panel 32 and front panel 34 can stack together, either totally flat (see FIG. 1) or still angled to some extent (see FIG. 13), resting on the roof 26 and leaving the front of the cabinet 20 exposed for access to objects supported upon trays 40 or other shelves within the cabinet 20. While the compound door 30 is shown in most of the cabinets 20 of FIGS. 12-14, one cabinet in FIG. 13 is shown with an alternate door 31. This alternate door 31 is merely a simple panel which pivotably attaches at a front forward portion of the roof 26 of the cabinet 20.

A lower door 35 is preferably provided which hinges to a forward edge of the floor 22 and allows for selective opening of a lower portion of the cabinet 20. The compound door 30 could be sized to cover the entire front of the cabinet 20 so that the lower door 35 would not be required. It is also conceivable that the lower door 35 could be sized to cover the entire front of the cabinet 20 so that the compound door 30 would not be required. The lower door can have a flexible or rigid sliding gusset support which keeps the lower door 35 from pivoting beyond horizontal, such as depicted in FIG. 1, so that the lower door 35 provides some extra working shelf space when opened.

Sides of the cabinet 20 are preferably selectively covered by side doors 33. These side doors 33 are preferably sized similar to the entire side surface of the cabinet 20 on each side of the cabinet 20. The side doors 33 could be hinged to the rear wall 24 or to the posts 28, or to other portions of the cabinet 20. Most preferably, the side doors 33 are hinged to the same hinge 50 which hinges the cabinet 20 to adjacent cabinets 20. Each hinge 50 is thus a compound hinge which allows for pivotable motion of two cabinets 20 relative to each other and also pivotable motion of two side doors 33 on sides of each cabinet 20 closest to the hinge 50. The sides of the cabinet 20 could alternatively be permanently enclosed.

With particular reference to FIGS. 11-15 and 21, details of the hinge 50 are described. The hinge 50 is shown in the first embodiment in the form of an upper portion and a lower portion which join adjacent cabinets 20 together. The upper portion includes upper leaves 54 which act upon a common pintle 52 and lower leaves 56 which act upon a separate common pintle 52. The upper leaves 54 include at least one leaf with at least one pintle receiving knuckle at an upper portion of the hinge 50 for each item hingedly attached thereto, and at least one leaf with at least one pintle receiving knuckle at a lower portion of the hinge 50 for each item hingedly attached thereto. Each pintle 52 thus supports at least four knuckles pivotably thereon with each knuckle part of one of a plurality of upper leaves 54, with one of the upper leaves 54 associated with each of the two cabinets 20 and one of the upper leaves 54 associated with each of the two side doors 33. Similarly, the lower portion of the hinge 50 includes a pintle 52 with at least four knuckles rotatably supported thereon with each of the knuckles associated with one of four lower leaves 56 affixed to each of the two cabinets 20 and to each of the two side doors 33.

A greater number of portions of the hinge 50 could be provided, such as also including a mid-portion of the hinge 50 with more leaves and an additional pintle. As another alternative, the hinge 50 could be configured as a piano hinge with a large number of knuckles and a long pintle. Such a piano hinge would preferably have a length similar to a height of the cabinets 20 so that the high loads exerted upon the hinge can be distributed over a large area. The leaves 54, 56, especially on the cabinet 20, are configured to be sufficiently large and from sufficiently high strength materials and sufficiently robust cabinet fasteners that they can carry the high bending loads which tend to act on the cabinets 20 when they are deployed out of the enclosure 60, and when the cabinets 20 have been loaded with heavy equipment.

With continuing reference to FIGS. 12-14, details of the trays 40 defining a preferred form of shelf or other support for contents of the cabinet 20 are described, according to this first exemplary embodiment. The trays 40 are shown with corners 42 adjacent posts 28 or adjacent edges of the rear wall 24. At least these corners 42 are supported to keep the trays 40 in a generally horizontal orientation at various different heights within the interior of the cabinet 20. The trays 40 are shown in this embodiment including a tapering rim 44 which follows a perimeter of the trays 40. This tapering rim 44 is shown with an angle of about 45° or less in FIGS. 12-14. In other embodiments, the tapering rim 44 could have a steeper angle, such as approaching vertical, with the tapering rim 44 most preferably being non-tapering and instead be a vertical rim. It is also conceivable that the trays 40 could be provided with no rim, but rather as flat shelves either fixed or movable. A main plate 46 defines a central portion of the tray 40 provided to support various different contents thereon.

The trays 40 are shown with three trays 40 per cabinet 20. Objects can be stored upon these trays 40 or could also be supported upon the floor 22 directly. If larger items are to be stored within the cabinet 20, some of the trays 40 could be removed or stacked nesting together, or conceivably all of the trays 40 could be removed with a large item resting upon the floor 22 directly. For other items, it might be desirable to have more than three trays 40 oriented horizontally within each cabinet 20. Furthermore, the cabinet 20 could be subdivided with a vertical subdivider and have a still larger number of smaller shelves or trays for supporting various different objects. The trays 40 could also be replaced with drawers if drawers are more preferred for the particular items to be contained.

Most preferably, the trays 40 can slide somewhat into and out of the cabinet 20, such as to provide more convenient access to rear portions of each tray 40. To facilitate such sliding of the trays 40, rails 48 can be provided extending from the rear wall 24 to the posts 28 (see FIG. 14). These rails 48 preferably include end legs 49 which extend downwardly from ends of the rails 48. These end legs 49 can include hooks therein which can engage holes in the posts 28 or can include holes which can receive pins which also extend into holes in the post 28 to facilitate movable positioning of the rails 48 to support the trays 40 at various different heights above the floor 22. If only side rails 48 are provided, the tray 40 can slide horizontally through the front of the cabinet 20 when the compound door 30 or alternate door 31 is open. When an optional further rail 48 extends horizontally between the posts 28, the tray 40 would need to be lifted somewhat before being moved forward to slide over the front rail 48.

The cabinet 20 could be particularly configured to store a variety of different items and might have the trays 40 replaced with other contents supports configured to support the particular items to be stored therein. For instance, a closet hanger bar might be provided if clothing is to be hung within one of the cabinets. If large numbers of small items are to be stored, a large number of small drawers with appropriate labeling could be provided for storing of these small items. Liquid items could be stored by providing an appropriate tank or vessel within at least a portion of one of the cabinets 20. If chilled items are to be stored within one of the cabinets 20, a refrigerator or ice cooler could be stored within one of the cabinets. Cabinets 20 which require power, (such as medical/veterinary equipment, e.g. ultrasound or other diagnostics equipment) would typically be located as an innermost cabinet and power to the unit can be provided through a separate power generator associated with the vehicle, or plugged into an auxiliary power outlet of the vehicle (DC or AC utilizing an inverter) or a self-contained power source can be provided with the powered unit contained within the cabinet 20 or within an adjacent cabinet 20. The types of object supports and the types of objects which can be contained with the cabinets 20 is virtually limitless.

With particular reference to FIGS. 1, 4 and 8-10, particular details of the enclosure 60 are described, according to a first exemplary embodiment. The enclosure 60 could be as simple as structures affixed directly to the bed B of the truck, and to rails R on sides of the bed B of the truck, to provide the bed B itself as one form of enclosure 60. Most preferably, the enclosure 60 is a separate structure which fits within the bed B and between rails R spanning sides of the bed B. If the bed B is a "flat bed" type installation, no rails R would be provided but the enclosure 60 could still be mounted to this flat bed floor of such a bed B.

Typically, the enclosure 60 has a length sufficiently short so that the tailgate T associated with the bed B can still be closed and provides some security for keeping the cabinets 20 within the enclosure 60. As an alternative, the tailgate T could be removed and in some embodiments at least portions of an outermost cabinet 20 could extend out past a rear bumper of the truck bed B somewhat.

Most preferably, the enclosure 60 includes a lid which is watertight and otherwise provides security for the cabinets 20 stored within the enclosure 60. The lid also adds rigidity to the enclosure 60. The enclosure 60 preferably has a width slightly greater than twice the width of the cabinets 20 so that two sets of cabinets 20 can fit on left and right sides of the enclosure 60. Alternatively, the enclosure 60 can be significantly wider than twice the width of the cabinets 20, sufficient to allow a user to crawl between the cabinets 20 when they are stored within the enclosure 60. The enclosure 60 could also be narrower to provide an elongate portion of the bed B open for storing elongate items outside of the enclosure 60. The enclosure could also house only a single set of cabinets that are either deeper (i.e. four feet deep) or only fill a portion of the width of the bed B.

The enclosure 60 includes side tracks 62 (see FIGS. 11 and 15-17) which are mounted on side walls of the enclosure 60 (or directly to an inner surface of the rails R of the bed B). These side tracks 62 preferably extend substantially horizontally and include an upper side track 62 and a lower side track 62. Wheels 70 are rotatably mounted to a rear side of the rear wall 24 including upper wheels 70 and lower wheels 70 (see FIG. 11) which roll along corresponding side tracks 62. These side tracks 62 are preferably configured to capture the wheels 70 sufficiently so that the side tracks 62 restrain the cabinets from all motion other than translation along a direction parallel with the side tracks 62 (along arrow A of FIGS. 2 and 8-10).

Preferably, floor tracks 64 are also located in the enclosure 60 (see FIGS. 4-7, 10 and 17). Wheels 70 are rotatably supported beneath the floor 22 of each cabinet 20 with the wheels 70 rolling in the floor tracks 64 to help to support a load of the cabinets 20 when they are contained within the enclosure 60. While the wheels 70 on the floor 22 are shown in an orientation to roll about a vertical axis, the wheels 70 most preferably are mounted to roll about a horizontal axis. Optionally, the floor tracks 64 could be dispensed with and the wheels 70 beneath the floor 22 could merely roll upon a floor of the bed B or a lower surface of the enclosure 60. The enclosure 60 can also optionally include a lockable door which can enclose a rear side of the enclosure 60, such as to secure the cabinets 20 when they are stored entirely within the enclosure 60.

In use and operation, and with particular reference to FIGS. 1-10, details of the operation of the storage system 10 are described, according to this first embodiment. Initially, the cabinets 20 are entirely stored within the enclosure 60 (FIGS. 2, 8 and 9). A user would initially lower the tailgate T and otherwise open a rear end of the enclosure 60. At least one of the sets of cabinets 20 is then allowed to translate horizontally out of the enclosure 60 (along arrow A of FIG. 2 or 8-10). Once one of the cabinets 20 has passed entirely out of the enclosure 60, the cabinet 20 is free to also pivot about the hinge 50 relative to an adjacent cabinet 20 (about arrow α of FIGS. 4 and 10).

In this embodiment, the innermost cabinet 20 remains within the enclosure 60 and acts to couple the cabinets 20 to the enclosure 60 and to the truck bed B. If desired, the innermost cabinet 20 can have doors thereon reconfigured somewhat to be most convenient for accessing of contents, such as with the alternative door 31 on the side facing outward and with no lower door 35. A full deployment of the cabinets 20 might be similar to that illustrated in FIG. 1, so that an area behind the bed B of the vehicle can be designated as a work area with all of the cabinets 20 generally facing this work area and being readily accessible by a user. When the cabinets 20 are to be re-stored within the enclosure 60, the deployment process is reversed and the cabinets 20 are rolled back into the enclosure 60, with the cabinets 20 then secure to allow the vehicle supporting the bed B to be driven to a new location along with all of the cabinets 20.

With particular reference to FIGS. 18-26, details of the alternative storage system 110 are described, as an alternative embodiment to that which is shown in FIGS. 1-17. The alternative storage system 110 has details similar to the first embodiment storage system 10 of FIGS. 1-17, except where distinctly described herein. The alternative storage system 110 is supported within a super structure 170 which defines a form of enclosure for the alternative storage system 110. This super structure 170 is particularly configured to exhibit a high degree of rigidity, such as to ensure that the cabinets 20 are well supported when deployed fully out of the super structure 170.

A cabinet support shell 120 is provided within this super structure 170. The cabinet support shell 120 acts in many ways similar to a cabinet 20 in that it can slide or roll into and out of the super structure 170 or other enclosure in the same manner that the cabinets 20 slide or roll. This cabinet support shell 120 does not extend all the way out of the super structure 170 or other enclosure 60, but rather merely moves from an interior of the super structure 170 out to an opening at a rear of the super structure 170.

An innermost one of the sets of cabinets 20 is in the form of a nesting cabinet 160. This nesting cabinet 160 (at least) is sized small enough to nest into the cabinet support shell 120. The other cabinets 20 can be the same size as the nesting cabinet 160 or could conceivably be slightly larger than the nesting cabinet 160 and have a perimeter size similar to a perimeter size of the cabinet support shell 120.

The cabinet support shell 120 is shown in this embodiment having a depth approximately half that of a cabinet 20. However, the cabinet support shell 120 could be as large as one of the cabinets 20 or could conceivably be somewhat smaller than the embodiment depicted in FIGS. 18-26. This cabinet support shell 120 includes a back wall 122 which is planar and oriented substantially vertically and with a top wall 124 and bottom wall 126 parallel and spaced from each other, and extending horizontally forward from the back wall 122. Sides 128 extend up from the bottom wall 126 to the top wall 124 which are mutually parallel and spaced from each other by a width of the cabinet support shell 120. A front side of the cabinet support shell 120 remains open.

Grooves 130 are formed in the sides 128 of the shell 120 which extend horizontally. These grooves 130 are configured to allow rollers 165 on a rear of the nesting cabinet 160 to roll or slide there along and to be captured thereby. Pivot plates 140 are pivotably attached to an outboard side 128 of the cabinet support shell 120. The grooves 130 are also formed in these pivot plates 140 with the grooves 130 generally continuous with the grooves 130 in the sides 128 of the cabinet support shell 120. Thus, the rollers 165 of the nesting cabinet 160 can not only slide within the grooves 130 and the sides 128 of the shell 120, but also along the grooves 130 of the pivot plates 140.

A piano hinge 150 pivotably attaches the pivot plates 140 to the sides 128. When the nesting cabinet 160 is rolled through the rollers 165 along the grooves 130 to place the nesting cabinet 160 out of the cabinet support shell 120, the nesting cabinet 160 remains mounted through the rollers 165 to the pivot plate 140 through the grooves 130. The piano hinge 150 is a highly robust hinge of sufficient strength that it can support the nesting cabinet 160 as well as other cabinets 20 pivotably attached in series to the nesting cabinet 160. Thus, the nesting cabinet 160 as well as the other cabinets 20 can each be fully deployed out of the enclosure, such as the super structure 170.

Figure 17:
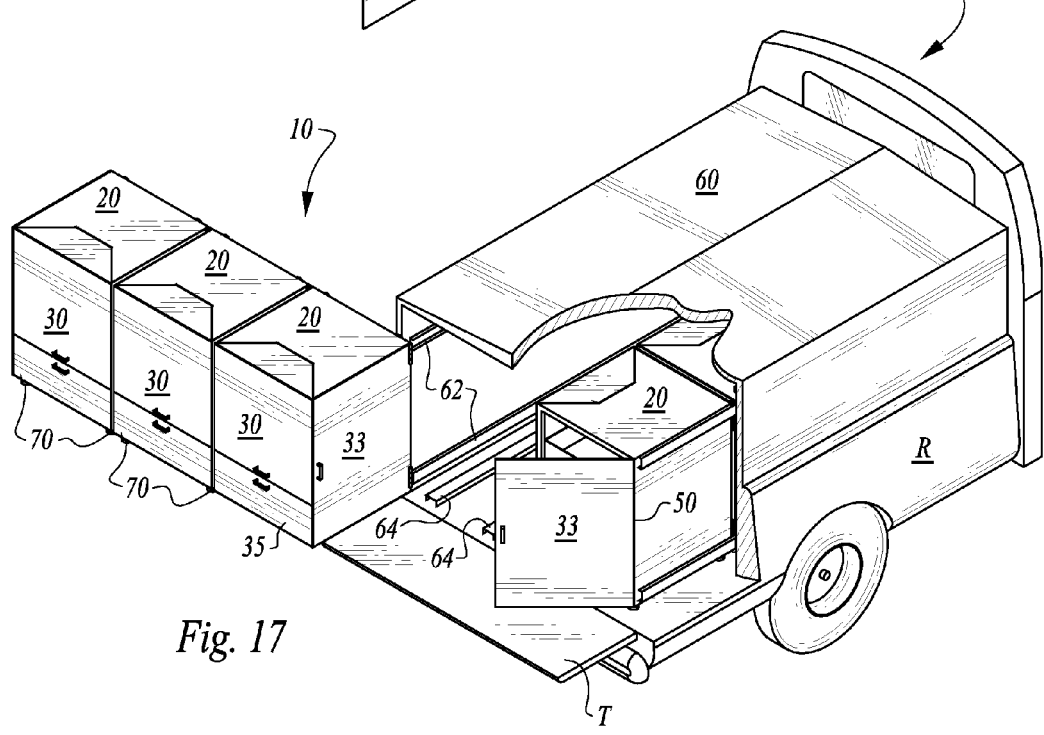

Such an arrangement facilitates deployment such as that depicted in FIG. 17, where full deployment of the series of cabinets 20, 160 out of the enclosure can be achieved. Sliding motion of the nesting cabinet 160 through action of the rollers 165 along the grooves 130 is depicted by arrow C of FIGS. 21 and 24. Pivoting action of the pivot plates 140 relative to the cabinet support shell 120 is depicted by arrow 6 of FIG. 23.

Doors of the nesting cabinet 160 can be similar to doors on other cabinets 20 of other embodiments disclosed herein.

With further reference to FIGS. 18-26, details of an exemplary deployment system 180 for use with the various different storage systems 10, 110 of this invention, is described. The deployment system 180 facilitates power assisted deployment and retraction of the sets of cabinets 20 into and out of the super structure 170 or other enclosure 60. In FIG. 18 the exemplary deployment system 180 is depicted including a chain 182 pivotably mounted about pulleys 184 at a forward and rearward portion of the super structure 170 and at a midline upper portion of this super structure 170. A driver 186 is mounted adjacent the chain 182, and typically is an electric motor with a drive shaft configured to power a sprocket engaging the chain 182, to cause the chain to move about the pulleys 184. The driver 186 is configured so that it can drive the chain 182 in either a clockwise or counter clockwise direction about the pulleys 184.

A shuttle 188 is fixed to an upper portion of each cabinet support shell 120 or other innermost cabinet 20. This shuttle 188 includes a pin 189 or other interconnection element which can be extended or retracted. When the pin 189 is retracted, the shuttle 188 is disengaged from the chain 182. When the pin 189 is extended, the pin 189 engages the chain 182 to provide an interconnection between the shuttle 188 and the associated cabinet support shell 120 and the chain 182.

Preferably, a controller is provided coupled to the driver 186 to cause the driver 186 to move in either clockwise and counter clockwise directions. Furthermore, preferably this controller is also coupled to the shuttles 188 of each cabinet support shell 120 or innermost cabinet 20 of each series of cabinets 20. This coupling is most preferably a wireless connection to avoid complex wiring arrangements. The controller can thus be in the form of a radio frequency remote control or other wireless transmitter (e.g. infrared) to control the driver 186 and the pins 189 of the shuttles 188.

When a user wishes to deploy the left series of cabinets, the user would first make a selection through the remote control device to engage the left series of cabinets to the chain 182. This selection would cause the pin 189 on the cabinets support shell 120 associated with the left series of cabinets to extend and engage the chain 182. After extension of the pin 189, the driver 186 would cause the chain 182 to rotate in a counter clockwise direction, causing a length of the chain 182 closest to the left side cabinets to be moving rearwardly between the two pulleys 184. The shuttle 188 would supply a force on the cabinet support shell 120 which would tend to push the left side series of cabinets out of the support structure 170 or other enclosure 60.

The deployment system 180 would either measure a distance traveled and/or would be configured to sense resistance to motion so that motion would cease when the series of cabinets 20 associated with the left side cabinet support shell 120 have been fully deployed. To deploy the right side cabinets, the pin 189 associated with the shuttle 188 on the left side cabinet support shell 120 would first be retracted and the pin 189 associated with the shuttle 188 on the cabinet support shuttle 120 associated with the right side series of cabinets would be extended to engage the chain 182. The driver 186 would then be caused to rotate in a clockwise direction to push the right side series of cabinets out of the super structure 170 or other enclosure 60.

If desired, both pins 189 of both shuttles 188 associated with both the left side and right side cabinet support shells 12 could be simultaneously coupled to the chain 182 so that a left side series of cabinets could be moved back into the super structure 170 or other enclosure 60 while the right side cabinets 20 are deployed. The user interface could be simplified, such to merely provide labeled buttons, such as a left side button and aright side button and to move the cabinets from their current position to the other position (stored or deployed) when the button is pushed (similar to a typical "garage door" opener control). Other forms of deployment systems could also be utilized, such as those known to provide motion of overhead garage doors, or for track advancement systems such as those utilized in automatic vehicle car wash systems or conveyer systems for amusement park rides or other similar powered conveyances.

In further alternative deployment systems a worm gear (or two, with on on each set of cabinets 20) could be used instead of a chain. Also, two chains could be provided, one for each set of cabinets 20. Belts would also be an alternative to chains. The drive mechanisms can be integrated together or be totally independent and can be positioned at other locations adjacent the sets of cabinets 20.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A truck bed storage system, comprising in combination:
a plurality of cabinets;
each cabinet having a rear wall bounded by substantially vertically extending rear corners and a front wall that defines a cabinet opening opposite said rear wall;
a hinge joining adjacent ones of said plurality of cabinets at said rear corners thereof; and
at least one of said plurality of cabinets slidably mounted to the truck bed to allow sliding into and out of the truck bed at least partially.

2. The system of claim 1 wherein the system includes an at least partial enclosure sized to fit within the truck bed, the enclosure having an interior sized to receive said plurality of cabinets therein.

3. The system of claim 2 wherein said enclosure includes at least one side wall, said side wall including at least one side track extending substantially horizontally along said side wall; and
wherein said at least one of said plurality of cabinets slidably mounted to the truck bed includes a bearing thereon, said bearing movable along said at least one track on said side wall of said enclosure.

4. The system of claim 3 wherein said at least one bearing includes at least one wheel rotatably attached to said rear wall of said cabinet, said at least one wheel adapted to roll along said track on said side wall of said enclosure.

5. The system of claim 4 wherein said at least one side wall of said enclosure includes at least two tracks including an upper track and a lower track, each of said tracks substantially parallel to each other and extending substantially horizontally along said side wall of said enclosure, said rear wall of said at least one cabinet slidably mounted to the truck bed including at least four wheels including at least two upper wheels and at least two lower wheels, said at least two upper wheels sized and positioned to roll along said upper track and said at least two lower wheels sized and positioned to roll along said lower track.

6. The system of claim 3 wherein a cabinet support shell is slidably mounted to said at least one track of said at least one side wall of said enclosure, said cabinet support shell having an open interior sized to receive at least one of said cabinets at least partially therein and adapted to support said at least one cabinet in a manner allowing said cabinet to slide into and out of said cabinet support shell.

7. The system of claim 6 wherein said at least one cabinet sized to fit within said interior of said cabinet support shell is a nesting cabinet having a smaller size than said interior of said cabinet support shell such that said nesting cabinet can fit into said interior of said cabinet support shell, said nesting cabinet adapted to both slide and pivot relative to said cabinet support shell without detachment from said cabinet support shell.

8. The system of claim 7 wherein said nesting cabinet includes a plurality of rollers thereon, said rollers adapted to roll within grooves in side walls of the cabinet support shell, and a pivot plate pivotably attached to an edge of said cabinet support shell adjacent an opening into said interior of said cabinet support shell, said pivot plate also including grooves extending substantially horizontally thereon and aligned with said grooves in sides of said cabinet support shell, such that said rollers of said nesting cabinet can roll from said grooves in said sides of said cabinet support shell onto said grooves in said pivot plate.

9. The system of claim 2 wherein said enclosure includes a floor track on a lower side of said enclosure, at least one of said cabinets including wheels extending below a floor thereof and positioned to roll along said floor track of said enclosure.

10. The system of claim 2 wherein said enclosure includes a rigid perimeter structure including a pair of opposite parallel side walls extending up from a lower wall to an upper wall with the upper wall spaced above the lower wall by a height greater than a height of said plurality of cabinets and said side walls of said enclosure spaced apart by a distance at least as great as a depth of said plurality of cabinets, such that said plurality of cabinets can fit within said enclosure.

11. The system of claim 1 wherein at least one of said cabinets includes a front door on a side of said cabinet opposite said rear wall, said front door being openable to allow access into an interior of said cabinet.

12. The system of claim 11 wherein said front door includes a compound door with a mount hinge located on a roof of said cabinet and a top panel joined to a front panel with the top panel alignable with said roof of said cabinet and said front panel alignable with a side of said cabinet opposite said rear wall.

13. The system of claim 12 wherein a lower door is pivotably attached to a side of said cabinet opposite said rear wall with said lower door hinged at a lower edge of said lower door, such that said lower door pivots downwardly to allow partial access into an interior of said cabinet.

14. The system of claim 11 wherein said cabinet includes at least one side door, said side door pivotably attached to said cabinet to allow opening of a side portion of said cabinet extending between said rear wall and a side of said cabinet opposite said rear wall.

15. The system of claim 14 wherein said at least one side door is pivoted to said cabinet about a common hinge with said hinge joining adjacent ones of said plurality of cabinets together at said rear corners of said cabinets.

16. The system of claim 1 wherein at least one of said cabinets includes a plurality of shelves therein, said shelves oriented substantially horizontally and extending substantially perpendicularly from said rear wall.

17. The system of claim 16 wherein said shelves are configured as movable trays which can move relative to said cabinet.

18. The system of claim 17 wherein said movable trays include a rim around a perimeter thereof, said movable trays resting upon separate substantially horizontal fixed shelves.

19. The system of claim 17 wherein said movable trays ride on rails extending between said rear wall and posts which extend vertically from a floor of the cabinet to a roof of the cabinet at a portion of the cabinet spaced from said rear wall.

20. A method for storage of equipment within a truck bed, including the steps of:
providing a plurality of cabinets, each cabinet having a rear wall bounded by substantially vertically extending rear corners and a front wall that defines a cabinet opening opposite said rear wall, a hinge joining adjacent ones of the plurality of cabinets at the rear corners thereof and at least one of the plurality of cabinets slidably mounted to the truck bed to allow sliding into and out of the truck bed at least partially;
loading equipment into interiors of the plurality of cabinets;
sliding the plurality of cabinets out of the truck bed;
pivoting the cabinets relative to each other about the hinge; and
accessing equipment within the cabinets when the cabinets are in this deployed position at least partially outside of the truck bed.

* * * * *